Nov. 30, 1943.     H. PANISSIDI     2,335,529
ROTARY SWITCH
Filed Jan. 27, 1943
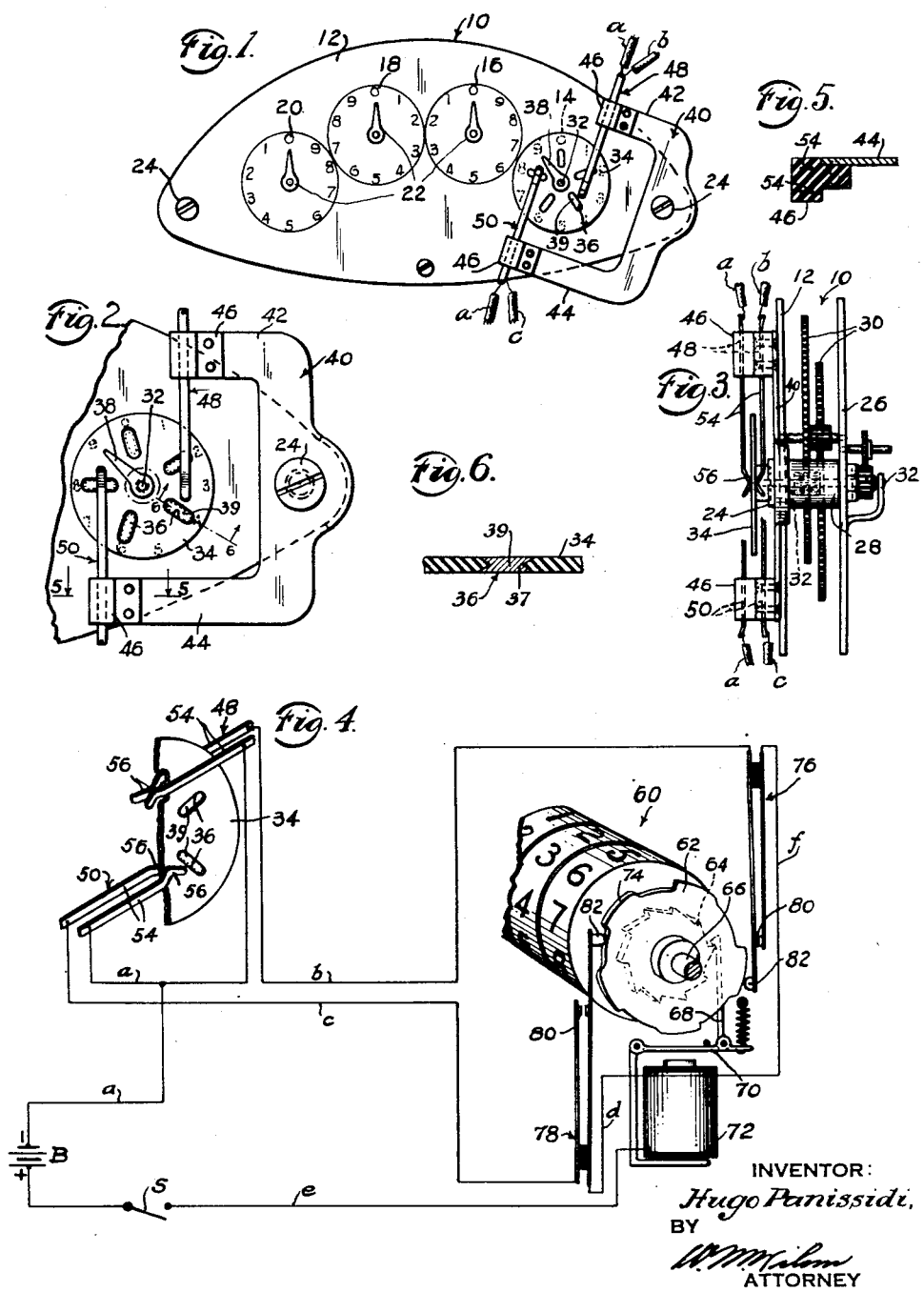
INVENTOR:
Hugo Panissidi,
BY
ATTORNEY Patented Nov. 30, 1943

2,335,529

UNITED STATES PATENT OFFICE 2,335,529

ROTARY SWITCH

Hugo Panissidi, Jamaica, N. Y., assignor to International Business Machines Corporation, New York, N. Y., a corporation of New York Application January 27, 1943, Serial No. 473,726

6 Claims. (Cl. 200—56)

The present invention relates to meter constructions and more particularly to an electrical "take-off" mechanism for watt-hour meters whereby an electrically operated auxiliary register, which may be located at a distance from the watt-hour meter, may receive electrical impulses from the latter and be caused to render a true indication of the meter reading.

Heretofore, various means for operating an auxiliary register in timed relation to a watt-hour meter have been devised, but none of these has met with a marked degree of success, due to the fact that each has required radical changes in design and construction of the original meter. Furthermore, where the apparatus is designed as an attachment to existing meters, the alterations required at the meter have been extensive and the cost of the installation has been high, both from the standpoint of cost of the parts and materials employed and of the time consumed in making the necessary alterations with the use of skilled labor.

An additional limitation that has been attendant upon the use of electric take-off mechanisms of the type set forth above has been the frictional resistance offered to the free rotation of the meter armature. Devices of this character, consisting, as they invariably do, of a meter-operated circuit maker and breaker, have heretofore been applied to and operated directly from the meter armature, its shaft, or some other moving part of the meter which is driven directly from the meter armature at a high gear ratio. Even though circuit makers and breakers of this type have been devised which will operate with fairly small effort, such devices still offer a decided and measurable resistance to the free rotation of the meter armature due to the extremely low power level at which the latter is operated. This phenomenon represents a loss in actual dollars and cents to the public utility corporation distributing the current, and this is a further reason why such devices have not met with any degree of success or widespread approval.

A still further limitation that has militated against the use of devices of the character set forth above, has been the fact that few of them make provision for preventing current interruption from affecting the step-up action of the register mechanism with the consequent result that each time a current interruption is encountered, the register, upon resumption of service, is stepped up and continues to register in advance of the meter, thus operating to the detriment of the consumer who ultimately is billed for an amount in excess of his true meter indication. Such a limitation takes on added significance in cases where a defective wiring system or a defective electrical appliance introduces a so-called "chattering" condition in the circuit in such a manner as to step-up the register inordinately.

Exemplary of meter take-off mechanisms of the type set forth above is the mechanism illustrated and described in the patent to Kinney, Serial No. 961,358, dated June 14, 1910, for Register mechanism for indicating instruments. Although the particular electrical circuit employed in the construction of the Kinney patent makes provision for preventing current interruption from stepping-up the register mechanism, the apparatus employed is no exception in other respects. Not only is it necessary to resort to extensive alterations to the original meter construction, but in addition the circuit maker and breaker employed derives its rotary motion directly from the meter armature shaft.

The present invention is designed as an improvement over the apparatus shown and described in the Kinney patent and over similar existing apparatus designed to accomplish the same purpose.

The improved circuit maker and breaker comprising the present invention is designed to overcome all of the above noted limitations that are attendant upon the use of take-off mechanisms of the type shown in the Kinney patent and toward this end contemplates the provision of a circuit maker and breaker of relatively simple design which may be attached to existing meter installations with a minimum amount of effort.

This being the principal object of the invention, a further object is to provide a rotary circuit maker and breaker, which instead of deriving its rotary motion directly from the meter armature or its shaft at relatively high gear ratio, derives its motion from the units dial pointer shaft of the meter, which is operated from the meter armature shaft at a relatively low gear ratio, thus materially reducing the frictional drag upon the meter armature.

Yet another object of the invention is to provide a circuit maker and breaker having a rotary member which is directly attachable to the units pointer shaft of the meter and which may be substituted for the original units pointer, yet which at the same time will not conceal the units dial or prevent a visual reading of the units digit on the units dial from being made.

The provision of a meter take-off apparatus, which is extremely simple in its construction; one which is comprised of a minimum number of moving parts, many of which may be constructed in the form of light sheet metal stampings; one which is designed to accommodate electrical circuits of the type shown in the above mentioned Kinney patent wherein provision is made for preventing stepping-up of the register upon current interruptions; one which is rugged and durable and which, therefore, is of long life; and one which is otherwise well adapted to perform the services required of it, are further desiderata that have been borne in mind in the production and development of the present invention.

Other objects and advantages of the invention, not at this time more particularly enumerated, will become more readily apparent as the nature of the invention is better understood.

In the accompanying single sheet of drawing forming a part of this specification:

Fig. 1 is a front elevational view of a meter dial face assembly to which the improved electrical take-off mechanism has been applied.

Fig. 2 is an enlarged detail fragmentary front elevational view of the assembly shown in parts in the vicinity of the units dial.

Fig. 3 is a side elevational view of the assembly shown in Fig. 2.

Fig. 4 is a fragmentary perspective view, more or less schematic in its representation, showing the electrical circuits and relay employed for operating the auxiliary register mechanism.

Fig. 5 is a sectional view taken substantially along the line 5—5 of Fig. 2.

Fig. 6 is a sectional view taken substantially along the line 6—6 of Fig. 2.

In all of the above described views, like characters of reference are employed to designate like parts throughout.

Referring now to the drawing in detail, and in particular to Figs. 1 and 3, the dial face assembly of a conventional watt-hour meter is designated in its entirety at 10 and includes a front dial face panel 12. Printed or otherwise indicated on the front face of the panel 12 are the usual units, tens, hundreds and thousands dial indications, designated at 14, 16, 18 and 20 respectively, the latter three dials having associated therewith tens, hundreds and thousands pointers collectively designated at 22. The front panel 12 is secured by means of bolts 24 to a rear plate 26 which is maintained spaced from the front panel by means of collars 28. The usual train of gearing 30 for operating the various pointer shafts is disposed between the front panel 12 and rear plate 26, as clearly indicated in Fig. 3. The arrangement of parts thus far described is purely conventional in its design and no claim is made herein to any novelty associated with the same, the novelty of this application consisting rather in the constructions, combinations and arrangements of parts now to be more fully described, illustrated and claimed.

The units pointer shaft is shown at 32 (see also Fig. 2) and projects forwardly of the front panel 12. The usual units pointer which is applied to this shaft has been removed and in its stead there has been substituted a transparent electrical take-off disc 34 having a plurality of radially extending spaced slots 36 provided with beveled edges as at 37. Pressed into each of the slots 36 and substantially filling the voids provided thereby is a metal conducting plug 39. The outer surfaces of these plugs 39 lie substantially flush with and form continuations of the smooth exterior surfaces of the mica disc 34. In the actual manufacture of the discs 34, after the plugs have been pressed into place, the discs may be polished exteriorly until the surface of the metal plugs 39 form a practically exact continuation of the outer surface of the disc in such a manner that no uneven ridges or groups are presented. While the plugs 39 may be formed of any suitable conducting material it is preferable that the same be formed of soft copper on account of the efficient conductivity of this latter metal and on account of its susceptibility to the polishing operation. An opaque pointer 38 is printed or otherwise marked on one surface of the transparent disc 34 and the numerals of the units dial 14 are visible relative to this pointer through the transparent disc. Also, while the disc 34 may be formed of any suitable transparent material, the same is preferably formed of mica on account of the extremely high dielectric characteristics of this material and on account of its relatively low coefficient of friction, the importance of which will become apparent presently.

Referring now to Figs. 1, 2 and 3, a U-shaped bracket 40 having a relatively short leg 42 and a relatively long leg 44 is secured to one edge of the panel 12 on the front side thereof by means of the fastening bolt 24. In the installation of the bracket 40, the original fastening bolt 24 of the conventional meter is removed and inserted through an aperture formed in the base of the member 40 and then restored to its original position with the legs 42 and 44 of the bracket straddling the place occupied by the units dial 14. Secured to the outer end of each of the legs 42 and 44 is an insulating block or holder 46, which holders serve to support a pair of contact assemblies 48 and 50 respectively (see also Fig. 4). Each contact assembly includes an insulating block 52 to which there is secured on opposite sides thereof a pair of spring contact members 54 carrying contacts 56 which are disposed on the inside of the members 54 in direct opposing relationship.

In the installation of the bracket 40, the pairs of contact-carrying members 54 are caused to straddle the mica disc 34 and bear against the opposite sides thereof. The bracket 40 is so oriented relative to the disc that the pair of contacts 56 bear against the disc at diametrically opposed regions and are adapted to encounter the plugs 39 in the disc alternately upon rotation of the disc.

Referring now to Fig. 4, an auxiliary cyclometer type register of the type shown in the patent to Kinney above referred to, is designated in its entirety at 60 and includes a cam disc 62 and a ratchet wheel 64 mounted upon the central axial shaft 66 of the cyclometer assembly 60. The ratchet wheel 64 is designed for cooperation with a pawl 68 carried by the armature 70 of a relay solenoid 72. The action of the relay solenoid 72 is such that each time it receives an impulse, its armature 70 is attracted and the cyclometer is advanced or stepped-up one indication at a time in a manner common to such assemblies. The periphery of the cam disc 62 is provided with a plurality of protuberances 74 corresponding to the number of apertures 36 provided in the transparent disc 34 of the dial assembly 10. A pair of contact assemblies 76 and 78 respectively, each having normally open contacts 80 associated therewith, are provided with followers 82 which ride upon the periphery of the disc 62 and operate to close the respective contacts of the unit in which they are contained each time one of the protuberances 74 is encountered by the follower 82 of one unit. The two units 76 and 78 are so disposed relative to the cam disc 62 that each time the follower 82 of one unit rides outwardly on the periphery of the disc 62 the other follower 82 rides inwardly thereon and thus the two pairs of contacts 80 are caused to close alternately in succession.

The two contact-carrying members 54 of the units 48 and 50, which occupy positions on the outside of the transparent disc 34, are connected together in common and to the negative side of battery B by means of a lead wire $a$. The other contact member 54 of the unit 48 is connected by lead wire $b$ to one element of the unit 76. The other member 54 of the unit 50 is connected by a lead wire $c$ to one element of the unit 78. The other element of the unit 78 is connected by a lead wire $d$ to one terminal of the solenoid 72, while the other terminal of this solenoid is connected through a switch S by a lead wire $e$ to the positive terminal of the battery B. Finally, to complete the circuit, the first mentioned terminal of the solenoid 72 is connected to one member of the unit 76 by a lead wire $f$.

In the operation of the apparatus, as the transparent disc 34 rotates in accordance with the current consumption as indicated by the meter assembly 10, the various contacts of the units 48 and 50 will alternately encounter one of the plugs 39 which are pressed into the disc and, depending upon which of the series of contacts 80 carried by the units 76 and 78 are shorted by the plugs, an impulse will be applied to the solenoid 72 which will operate to advance the cyclometer 60 one step. Immediately thereafter, the pair of contacts 80 through which this impulse was applied to the solenoid 72 will become opened and the other pair of contacts 80 will become closed ready to transmit the next impulse. Because of the fact that the first pair of impulse transmitting contacts 80 becomes open immediately after transmitting an impulse, additional impulses applied to the circuit, as, for example, when current interruptions are encountered, will fail to actuate the solenoid 72. In this manner the cyclometer 60 will at all times remain synchronized with the movements of the disc 34.

From the above description it will be seen that because of the fact that the metal plugs 39 have smooth polished exterior surfaces and form substantial continuations of the opposite surfaces of the mica disc very little friction will be offered to the sliding movement of the contact members 54. Thus, negligible frictional torque will be transmitted to the meter armature shaft. Furthermore, whatever slight amount of friction may exist between the opposed surfaces of the contacts 56 and the disc 34 will be of a constant nature, thus facilitating maximum calibration of the meter at the time of installation and during any subsequent checking operation that may be performed. It will also be seen that because of the fact that the edges of the slots 36 are beveled, as shown at 37, and the plugs 39 are pressed into these slots the plugs will be securely held against dislodgment and no adhesives or other sealing means which is liable to cause fouling of the contacts need be resorted to. Finally, it will be seen that the completed discs 34 readily lend themselves to manufacture at a minimum expense inasmuch as these members may be constructed of light stampings and the pressing operations on all of the slots may be performed simultaneously by a simple die pressing operation.

The invention is not to be limited to the exact arrangement of parts shown in the accompanying drawing or described in this specification as various changes in details of construction may be resorted to without departing from the spirit of the invention. Only insofar as the invention has been particularly pointed out in the accompanying claims is the same to be limited.

What is claimed is:

1. A circuit maker and breaker comprising a rotary disc formed of insulating material mounted for rotation about an axis, a stationary support positioned adjacent said member, two pairs of cooperating spring contacts carried by said support and a plurality of radially disposed spaced circuit closing members carried by said disc and adapted to enter between the contacts of each pair to effect alternate electrical contact between the same.

2. A circuit maker and breaker comprising a disc-like member mounted for rotation about an axis, there being an aperture in said disc, a stationary support positioned adjacent the disc, a pair of cooperating spring contacts carried by said support and bearing against said disc on opposite sides thereof in the path of movement of said aperture, said disc being formed of insulating material and said contacts being adapted to become periodically closed through said aperture upon rotation of the disc.

3. A circuit maker and breaker comprising a disc mounted for rotation about an axis, there being a plurality of circumferentially spaced openings in said disc, a stationary support positioned adjacent said disc, a pair of spring contacts carried by said support and bearing against the opposite sides of said disc and positioned directly in the path of movement of said openings, said disc being formed of insulating material and said contacts being adapted to become closed through said openings upon rotation of the disc.

4. A circuit maker and breaker comprising a disc-like member mounted for rotation about an axis, there being a plurality of equally spaced, circumferentially disposed contact-shorting members extending through said disc, a stationary support adjacent the disc, a pair of cooperating spring contacts carried by said support and bearing against said disc on opposite sides thereof in the path of movement of said members, said disc being formed of insulating material and said contacts being adapted to become periodically closed by said contact-shorting members upon rotation of the disc.

5. A circuit maker and breaker comprising a disc mounted for rotation about an axis, there being a plurality of circumferentially spaced openings in said disc, electrically conductive contact-shorting elements disposed in said openings, a stationary support positioned adjacent said disc, a pair of spring contacts carried by said support and bearing against the opposite sides of said disc and positioned directly in the path of movement of said openings, said disc being formed of insulating material and said contacts being adapted to become closed through said openings upon rotation of the disc.

6. A circuit maker and breaker comprising a transparent disc-like member adapted to be attached to the units pointer shaft of an electric watt-hour meter and to overlie the units dial of the meter and through which the latter is visible, an opaque radially disposed indicating pointer on said disc for cooperation with said dial to render a visible reading, there being five equally spaced, circumferentially disposed apertures extending through said disc, electrically conductive contact-shorting elements disposed in said openings, a U-shaped bracket secured to said face plate in the vicinity of said disc and having parallel arms disposed on opposite sides of said disc and occupying positions substantially in the plane of the disc, a pair of spring contacts carried by each arm and bearing against said disc on opposite sides thereof, said disc being formed of insulating material and said contacts being adapted to become periodically and alternately closed by said elements through said apertures upon rotation of said disc.

HUGO PANISSIDI.